United States Patent [19]

Flick

[11] Patent Number: 6,037,859
[45] Date of Patent: Mar. 14, 2000

[54] VEHICLE SECURITY SYSTEM INCLUDING CONTROL SWITCH MOUNTED TO WINDOW ANTENNA UNIT AND ASSOCIATED METHODS

[76] Inventor: Kenneth E. Flick, 5236 Presley Pl., Douglasville, Ga. 30135

[21] Appl. No.: 09/035,546

[22] Filed: Mar. 5, 1998

[51] Int. Cl.$^7$ ............................................. B60R 25/10
[52] U.S. Cl. ................... 340/426; 340/425.5; 307/10.2; 307/10.4
[58] Field of Search ................. 340/426, 425.5, 340/825.32, 825.34; 307/10.2, 10.4

[56] References Cited

U.S. PATENT DOCUMENTS

| | | | |
|---|---|---|---|
| 4,881,148 | 11/1989 | Lambropoulos et al. | 361/172 |
| 4,928,098 | 5/1990 | Dannhaeuser | 340/825.56 |
| 4,975,969 | 12/1990 | Tal | 382/2 |
| 5,049,867 | 9/1991 | Stouffer | 340/426 |
| 5,055,701 | 10/1991 | Takeuchi | 307/10.2 |
| 5,099,226 | 3/1992 | Andrews | 340/572 |
| 5,103,221 | 4/1992 | Memmola | 340/825.31 |
| 5,146,215 | 9/1992 | Drori | 340/825.32 |
| 5,243,322 | 9/1993 | Thompson et al. | 340/429 |
| 5,252,966 | 10/1993 | Lambropoulos et al. | 340/825.69 |
| 5,278,547 | 1/1994 | Suman et al. | 340/825.32 |
| 5,365,225 | 11/1994 | Bachhuber | 340/825.31 |
| 5,406,274 | 4/1995 | Lambropoulos et al. | 340/825.69 |
| 5,412,379 | 5/1995 | Waraksa et al. | 340/825.72 |
| 5,442,341 | 8/1995 | Lambropoulos | 340/825.31 |
| 5,467,070 | 11/1995 | Drori et al. | 340/426 |
| 5,469,506 | 11/1995 | Berson et al. | 380/23 |
| 5,513,105 | 4/1996 | Krones | 364/424.01 |
| 5,563,579 | 10/1996 | Carter | 340/539 |
| 5,654,688 | 8/1997 | Allen et al. | 340/426 |
| 5,729,191 | 3/1998 | Allen et al. | 340/426 |
| 5,751,072 | 5/1998 | Hwang | 307/10.4 |

FOREIGN PATENT DOCUMENTS

| | | | |
|---|---|---|---|
| 0 535 555 A1 | 9/1992 | European Pat. Off. | E05B 49/00 |
| 43 25 221 A1 | 7/1993 | Germany | B60R 25/00 |
| 91/15645 | 10/1991 | WIPO | E05B 49/00 |

*Primary Examiner*—Jeffery A. Hofsass
*Assistant Examiner*—Sihong Huang
*Attorney, Agent, or Firm*—Allen, Dyer, Doppelt, Milbrath & Gilchrist, P.A.

[57] ABSTRACT

A vehicle security system includes an antenna carried by a first housing for positioning adjacent the front windshield area of the vehicle, a control switch carried by the first housing, and a security controller positioned in spaced apart relation from the first housing and being responsive to signals from a remote transmitter and also being responsive to the control switch. The antenna is for receiving signals from the one or more remote transmitters. The control switch may be a momentary contact switch. The security controller is preferably switchable between armed and disarmed modes. According to one aspect of the invention, the security controller may include a coded override feature for switching to the disarmed mode from the armed mode responsive to operation of the control switch in a predetermined pattern based upon a user override code. The coded override may accept an override code input as a series of control switch operations. The security controller may also be switchable to a valet mode when in the disarmed mode responsive to the control switch. In the valet mode the security controller is prevented from passively arming. The control switch may be used to enter a programming mode and/or permit programming of the system features.

39 Claims, 2 Drawing Sheets

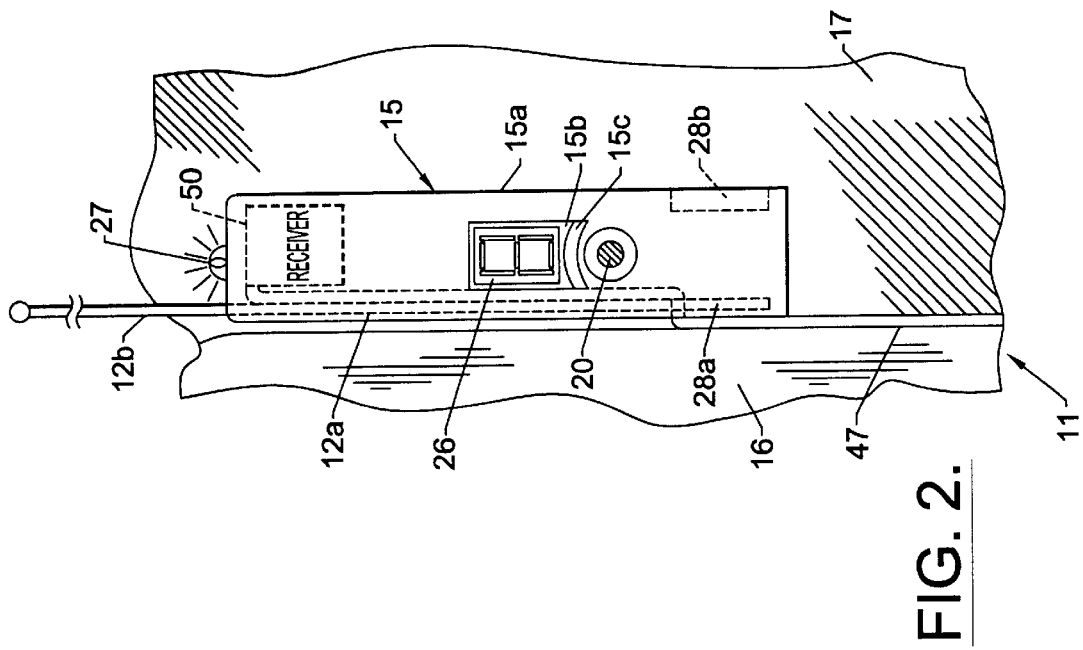
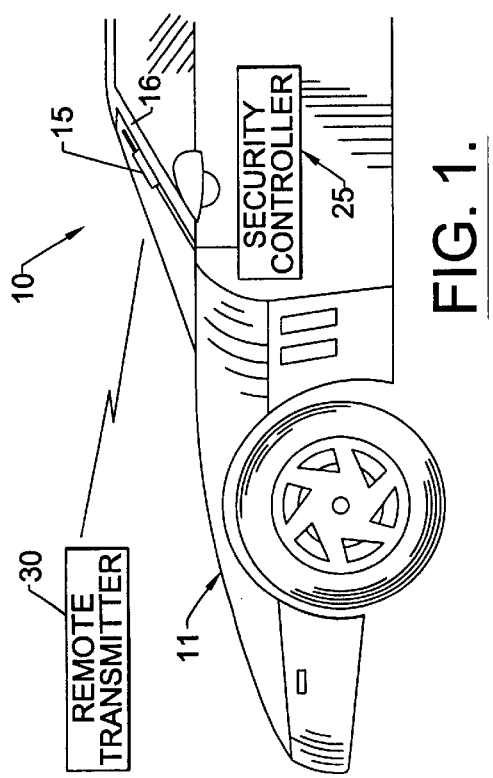
FIG. 1.
FIG. 2.

VEHICLE SECURITY SYSTEM INCLUDING CONTROL SWITCH MOUNTED TO WINDOW ANTENNA UNIT AND ASSOCIATED METHODS

FIELD OF THE INVENTION

The invention relates to the field of security systems, and more particularly, to a vehicle security system including enhanced operating and control features.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the vehicle security system or provide other remote control features from a predetermined range away from the vehicle.

As disclosed in U.S. Pat. No. 5,049,867 to Stouffer and U.S. Pat. No. 5,146,215 to Drori, the security system controller may include features to store and compare unique codes associated with a plurality of remote transmitters, each remote transmitter having its own unique code initially programmed therein. U.S. Pat. No. 5,146,215 in particular discloses that remote transmitter codes may be added or deleted from the controller corresponding to the number of remote transmitters desired by the user. Unfortunately, a would-be thief gaining access to the controller may readily enter the program or learn mode and install the code of an unauthorized remote transmitter. The owner would thus be unaware of such activity, until the thief returns with the unauthorized remote transmitter to disarm the security system and steal the vehicle, or steal the vehicle contents.

U.S. Pat. No. 5,654,688, assigned to the assignee of the present application, discloses a significant advance in the area of vehicle security, particularly as it relates to ensuring the number of authorized remote transmitter. The patent discloses identifying the number of remote transmitters coded to operate the vehicle security system and giving this indication so that the user is informed if an unauthorized remote transmitter has been added.

It may also be desirable to extend the range from which a remote transmitter will operate. In the past an antenna has been positioned in the upper passenger compartment, such as the window of the vehicle, to increase the effective control range.

There are also other desirable features of many conventional vehicle security systems, such as the ability to place the system in a valet mode so that others may use the vehicle without triggering the alarm. Typically a valet switch is positioned so as to be hidden in an area not readily visible in the vehicle. The user may operate the valet switch to enter the valet mode and exit the valet mode. In addition, the valet switch also has been used to permit the user to stop an alarm, such as when the user loses a remote transmitter or the battery fails, for example. The hidden valet switch may be awkward to operate and may also be of limited security value, since there are only so many places to position such an important switch within the vehicle.

The assignee of the present invention has also provided other advantageous features, such as an easier to use valet switch, wherein the user can toggle in or out of the valet mode as long as the alarm controller is in the disarmed mode. To permit the valet switch to operate without a code, the assignee of the present invention has also provided a coded override switch which requires the user to enter a code to disarm the system when an alarm is sounding.

SUMMARY OF THE INVENTION

In view of the foregoing background, it is therefore an object of the present invention to provide a vehicle security system and related methods wherein the range of the remote transmitter is extended and desirable control features are also made easier to operate.

These and other objects, features and advantages in accordance with the present invention are provided by a vehicle security system including an antenna carried by a first housing for positioning adjacent the front windshield area of the vehicle, a control switch carried by the first housing, and a security controller positioned in spaced apart relation from the first housing and being responsive to signals from a remote transmitter and also being responsive to the control switch. The antenna is for receiving signals from the one or more remote transmitters. The control switch may be a momentary contact switch.

The security controller is preferably switchable between armed and disarmed modes. When in the armed mode, the controller is capable of generating an alarm responsive to a sensed vehicle condition. The security controller may also include passive arming means for passively arming by switching to the armed mode responsive to a sensed vehicle condition. According to one particularly advantageous feature of the invention, the security controller may include coded override means for switching to the disarmed mode from the armed mode responsive to operation of the control switch in a predetermined pattern based upon a user override code. For example, the coded override means may accept a multi-digit override code input as a series of control switch operations. An indicator carried by the first housing may cooperate with the security controller to acknowledge input of the entered override code.

According to another advantageous aspect of the invention, the security controller may also be switchable to a valet mode when in the disarmed mode responsive to the control switch. In the valet mode the security controller is prevented from passively arming. In other words, the control switch carried by the housing may be a valet switch. In accordance with yet another aspect of the invention, the control switch may be used to enter a programming mode and/or permit programming of the system features.

The first housing may have a generally rectangular elongate shape. A receiver may be positioned in the first housing and the receiver is preferably connected to the antenna and the security controller. In addition, a second housing may be provided for the security controller. An interconnecting cable preferably extends between the first housing and the second housing. Another feature of the invention is the provision of first and second redundant connectors mounted in spaced relation on the first housing so that the interconnecting cable is connectable to one of the connectors to facilitate routing of the interconnecting cable.

A method aspect of the invention is for operating a vehicle security system for a vehicle of a type comprising a front windshield area. The vehicle security system includes a remote transmitter, a first housing for positioning adjacent the front windshield area of the vehicle, an antenna carried by the first housing for receiving signals from the remote transmitter, and a security controller positioned in spaced apart relation from the first housing and being operatively connected to the antenna to be responsive to signals from the remote transmitter. The method preferably further comprises the steps of providing a control switch carried by the first housing, and operating the security controller responsive to the control switch.

BRIEF DESCRIPTION OF THE DRAWINGS

FIG. 1 is a schematic diagram of a vehicle security system mounted in a vehicle in accordance with the present invention.

FIG. 2 is an enlarged front view of the first housing for the antenna and receiver shown mounted on the windshield adjacent the driver's side roof pillar in accordance with the present invention.

DETAILED DESCRIPTION OF THE PREFERRED EMBODIMENTS

Figure 3:
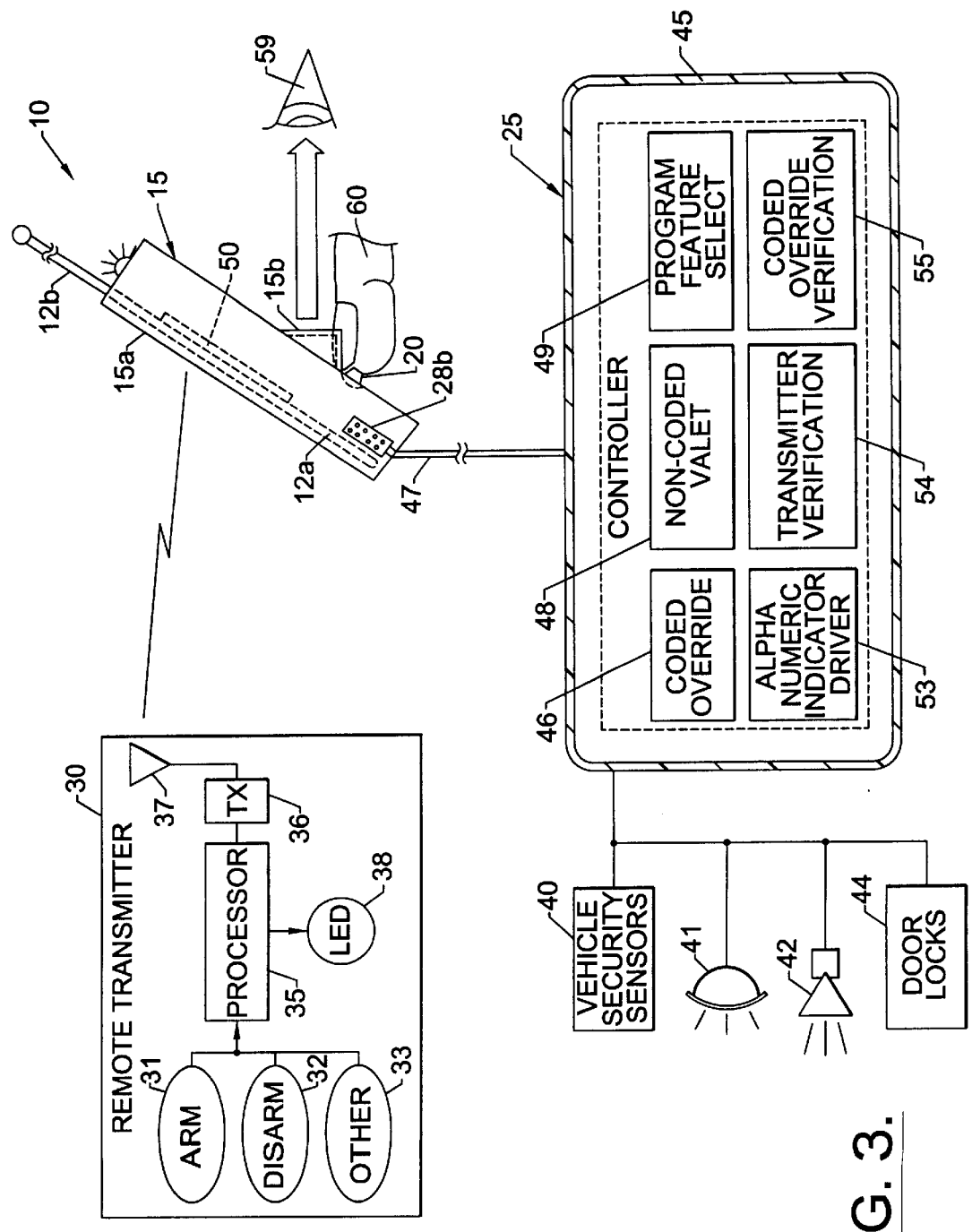
FIG. 3 is a schematic block diagram of the vehicle security system in accordance with the present invention illustrating the system in greater detail.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Turning now initially to FIGS. 1 and 2, the components of the vehicle security system 10 positioned in a vehicle 11 in accordance with the present invention are described. The vehicle security system 10 includes an antenna which may either be an internal antennal 12a or an external antenna 12b, or a combination of internal and external, and preferably in the form of a vertical conductor, for example. The antenna 12a, 12b is carried by a first housing 15 for positioning adjacent the front windshield 17 of the vehicle 11. The first housing 15 may be positioned adjacent the driver's side roof pillar 16 as shown in the illustrated embodiment. Those of skill in the art will appreciate other similar positions in the vehicle 11 which will provide a more effective location for the antenna 12a, 12b rather than its traditional placement under the dash area, for example.

A control switch 20 is carried by the first housing 15. In addition, the security system 10 includes a security controller 25 positioned in spaced apart relation from the first housing 15. For example, the security controller 25 may be positioned in a lower forward portion of the passenger compartment, such as under the dashboard, for example, as will be readily understood by those skilled in the art.

The security controller 25 is responsive to signals from one or more remote transmitters 30 as will be readily appreciated by those skilled in the art. The security controller 25 is also responsive to the control switch 20 as will be described in greater detail below. The antenna 12a, 12b, of course, is for receiving signals from the one or more remote transmitters 30. The control switch 20 may be a momentary contact switch, for example, as will also be readily appreciated by those skilled in the art.

Referring now additionally to FIG. 3, the security controller 25 is preferably switchable between armed and disarmed modes, such as based upon signals from the remote transmitter 30. As would be readily appreciated by those skilled in the art, a typical remote transmitter 30 may include arm 31, disarm 32 and one or more other 33 pushbutton switches. The illustrated remote transmitter 30 also includes a processor 35 coupled to a transmitter 36 and an internal antenna 37 as would be readily understood by those skilled in the art. The remote transmitter 30 may also include an LED 38, which may flash to confirm transmission, for example. A battery, not shown, may also be used to power the remote transmitter 30.

When in the armed mode, the controller 25 is capable of generating an alarm signal responsive to a sensed vehicle condition from the schematically illustrated vehicle sensors 40. Those of skill in the art will readily appreciate that such sensors may include door, trunk, hood switches, as well as more complicated proximity or motion sensors. The security controller 25 may also be operatively be connected to the vehicle lights 41, to a siren 42, or the vehicle horn, for example. Of course, the security controller 25 may be coupled to a cellular telephone or other wireless communication device to transmit a remote alarm indication in addition to or as an alternative to the conventional local alarm indication.

The controller 25 may also be connected to control the vehicle door locks 44 as will be readily appreciated by those skilled in the art. As will also be readily appreciated by those skilled in the art the features described herein in detail with reference to a security system providing an alarm indication also apply to a remote keyless entry system which provides vehicle security by controlling the vehicle door locks 44 without performing some of the other more advanced security features, including the alarm indication. Accordingly, the term vehicle security system is used to include such remote keyless entry systems as well.

The security controller 25 may also include passive arming means for passively arming by switching to the armed mode responsive to a sensed vehicle condition. For example, the security controller 25 may enter the armed mode a predetermined time after the engine is turned off and the last door is closed thereby indicating that the user has left the vehicle. Those of skill in the art will appreciate that other passive arming scenarios are also contemplated by the invention without requiring further description herein.

As shown in the illustrated embodiment, the security controller 25 may be positioned in a second housing 45. The second housing 45 may be located out of sight in the forward lower portion of the vehicle, for example, or any other conventional mounting location as will be appreciated by those skilled in the art. An interconnecting cable 47 extends between the first and second housings 15, 45, to interconnect the components thereof. In one particularly advantageous embodiment, the first housing 15 also contains the radio frequency receiver 50. The receiver 50 may comprise one or more integrated circuits or discrete circuit components mounted on a printed circuit board, for example. By positioning the receiver 50 in the first housing 15 adjacent the antenna 12a, 12b, the radio signal may be received and demodulated, so that the cable 47 may only need insulated wires rather than a coaxial cable, as will be readily appreciated by those skilled in the art. In addition, the sensitivity of the reception may also be increased by positioning the receiver 50 in the first housing 15 without requiring a relatively long interconnecting cable for the RF signal.

According to another particularly advantageous feature of the security system 10, the security controller 25 may include coded override means 46 for switching to the disarmed mode from the armed mode responsive to operation of the control switch 20 in a predetermined pattern based upon a user override code. Those of skill in the art will appreciate that the coded override means 46 or feature may be implemented in a microprocessor operating under stored program control. Alternately, the coded override could be implemented with discrete logic components.

The coded override feature, for example, allows the user to turn off the alarm indication when the user returns to the vehicle without a properly functioning remote transmitter to switch the controller to the disarmed mode. When the user opens the door with the key, the alarm will sound and the user needs to stop the alarm. In addition, since the vehicle security controller 25 also may include vehicle shutoff circuits for the fuel, starter, and/or ignition, the coded override allows the vehicle to be operated.

The coded override means 46 may accept a digital override code input as a series of control switch 20 operations. For example, the user code may comprise a two digit code of from 01 to 99. A first digit is input by depressing the control switch 20 the prescribed number of times, waiting a prescribed period, and inputting the second digit in a similar manner. Since the control switch 20 is in plain view and easily accessible within the vehicle, the convenience of this feature is greatly enhanced. This is especially so since the alarm may be sounding as the user inputs the override code.

An indicator carried by the first housing 15 may cooperate with the security controller to acknowledge input of the override code. For example, the alphanumeric indicator 26 or the LED indicator 27 may be used. Alternately, or in addition to one of these indicators, the vehicle horn or siren 42 could be sounded or chirped to acknowledge input.

Yet another feature related to the control switch 20 conveniently mounted on the window unit or first housing 15, relates to an easily implemented valet feature. In particular, according to another advantageous aspect of the invention, the security controller 25 may also be switchable to a valet mode when in the disarmed mode responsive to the control switch 20. In other words, the security controller 25 includes non-coded valet means 48 for switching into or out of the valet mode by pressing the control switch 20. Accordingly, the user can toggle into or out of the valet mode, but only when the vehicle is already in the disarmed mode. In the valet mode the security controller is prevented from passively arming. Of course, the non-coded valet means 48 may be implemented with a processor which performs the other security functions, or with discrete logic components as will be readily appreciated by those skilled in the art.

In accordance with yet another aspect of the invention, the control switch 20 may be used to enter a programming mode and/or permit programming of the system features. Those of skill in the art will appreciate that for many vehicle security systems, there are a number of programmable or settable features, such as alarm duration, various timers, etc. Typically the installer or user sets the controller 25 to a learning or programming mode, and the individual selectable features may be sequentially selected. Accordingly, the particular sequence and features are not important to this aspect of the invention; rather, the ability to program from the control switch 20 is a significant feature of the present invention. The program/feature select means 49 of the security controller 25 may be implemented also using the same processor as the other features. A coded pressing of the switch 20 may be required to enter the programming mode, and/or one or more vehicle conditions may need to exist prior to permitting entry into the programming mode as will also be appreciated by those skilled in the art.

The first housing 15 may have a generally rectangular elongate shape. Another feature of the security system 10 is the provision of first and second redundant connectors 28a, 28b mounted in spaced relation on the first housing 15 so that the interconnecting cable 47 is connectable to one of the connectors to facilitate routing of the interconnecting cable. The first housing 15 may be mounted on the left or right side of the front window 17, for example. In addition, the first housing 15 may be mounted adjacent the rearview mirror or other areas where the ability to connect the cable 47 to either side of the housing 15 is a significant advantage for providing a simple and clean installation.

Another important user convenience feature of the present invention is the provision of at least one indicator carried by the first housing 15. An indicator in the illustrated embodiment is an alphanumeric indicator 26 as will be understood by those skilled in the art. The alphanumeric indicator 26 is relatively compact and thus facilitates placement on the housing 15 which also contains the antenna 12. The antenna 12a, 12b may be preferably placed in a vertical orientation, such as may be desired enhanced reception from the remote transmitter 30. The alphanumeric indicator 26 is operatively connected to the alphanumeric indicator drive means 53 of the security controller 25. The indicator 26 may be used to convey many types of information readily and easily to a user.

In the past, many conventional vehicle security systems had only a single LED to be flashed to the user. Accordingly, the amount of information conveyed by flashes of the LED is limited in comparison to the alphanumeric display 26 of the security system 10 of the present invention. In the illustrated embodiment, security system 10 also includes a simple LED 27 which may also convey information to a user, such as flashing to indicate an armed condition, as will be appreciated by those skilled in the art. Other uses are also contemplated for the alphanumeric indicator 26 and its associated driver or drive means 53 as will be readily appreciated by those skilled in the art.

For example, the alphanumeric indicator 26 may convey information on the current mode of the security system 10. The indicator 26 may also or alternately be used for displaying an indication related to the status of the vehicle sensors 40 to the user. For example, a history or current operating state of a sensor could be displayed. The alphanumeric display 26 could also be used during programming of the security system functions, so that the programming is considerably easier than with conventional systems.

Several other important types of information may also be readily communicated to the user in accordance with other aspects of the invention. The security controller 25 may include transmitter verification means 54 for determining a number of uniquely coded remote transmitters 30 capable of operating the security controller. If the number changes, or there is some other indication that a learning mode for the transmitters has been recently entered, the user receives notification. This feature prevents unauthorized learning of a remote transmitter that can later be used to defeat the security system.

The transmitter verification feature is further explained in U.S. Pat. No. 5,654,688, the entire disclosure of which is incorporated herein by reference in its entirety. Other aspects of transmitter verification are disclosed in U.S. patent application Ser. No. 08/681,785, filed Mar. 25, 1996 entitled "Remote Control System Suitable for a Vehicle and Having Remote Transmitter Verification", the entire disclosure of which is also incorporated herein by reference in its entirety.

The transmitter verification means 54 may cooperate with the alphanumeric indicator driver 53 and the indicator 26 to thereby indicate the number of remote transmitters 30 capable of operating the security controller 25 to the user. The security controller 25 may also include coded override verification means 55 for determining a number of override codes capable of operating the security controller on the indicator, along the lines of the remote transmitter verification feature described above. Both verification features may be readily implemented using a processor or circuitry as described above for the other features of the security system 10 as will be readily appreciated by those skilled in the art.

Yet another aspect of the first housing 15 is that it may include a body portion 15a and an indicator mounting portion 15b extending outwardly therefrom at a predetermined angle so that when the body portion is mounted to an inclined windshield 17 the alphanumeric indicator 26 is mounted in a generally upright orientation for easier viewing by the eyes 59 of the user as shown in the upper right-hand portion of FIG. 3.

The control switch 20 may also be advantageously positioned below the indicator mounting portion 15b. Accordingly, the indicator mounting portion 15b preferably has an arcuate surface 15c on a lower portion thereof for guiding a finger 60 (FIG. 3) of the user to the control switch 20. Accordingly, the use of switch 20 and overall operation of the security system 10 are greatly enhanced.

One method aspect of the invention is for operating a vehicle security system 10 for a vehicle 11 of a type comprising a front windshield area 17. The vehicle security system 10 preferably includes a remote transmitter 30, a first housing 15 for positioning adjacent the front windshield area of the vehicle, an antenna 12a, 12b carried by the first housing for receiving signals from the remote transmitter, and a security controller 25 positioned in spaced apart relation from the first housing and being operatively connected to the antenna to be responsive to signals from the remote transmitter. The method preferably further comprises the steps of providing a control switch 20 carried by the first housing, and operating the security controller 25 responsive to the control switch.

Another method aspect of the invention is also for operating a vehicle security system 10 for a vehicle 11 of a type comprising a front windshield area 17. The vehicle security system 10 preferably comprises at least one remote transmitter 30 to be carried by a user, a first housing 15 for positioning adjacent the front windshield area of the vehicle, an antenna 12a, 12b carried by the first housing for receiving signals from the remote transmitter, and a security controller 25 positioned in spaced apart relation from the first housing and being operatively connected to the antenna. The method preferably comprises the steps: providing an indicator 26 on the first housing, and driving the indicator with the security controller. The step of providing the indicator preferably comprises providing at least one alphanumeric indicator 26.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle security system for a vehicle of a type comprising a front windshield area, said vehicle security system comprising:
   at least one remote transmitter to be carried by a user;
   a first housing for positioning adjacent the front windshield area of the vehicle;
   an antenna carried by said first housing for receiving signals from said at least one remote transmitter;
   a control switch carried by said first housing; and
   a security controller positioned in spaced apart relation from said first housing and being operatively connected to said antenna to be responsive to signals from said at least one remote transmitter, said security controller also being responsive to said control switch.

2. A vehicle security system according to claim 1 wherein said security controller is switchable between armed and disarmed modes; wherein said security controller when in the armed mode is capable of generating an alarm signal responsive to a sensed vehicle condition; and wherein said security controller comprises passive arming means for passively arming by switching to the armed mode responsive to a sensed vehicle condition.

3. A vehicle security system according to claim 2 wherein said security controller comprises coded override means for switching to the disarmed mode from the armed mode responsive to operation of said control switch in a predetermined pattern based upon a user override code.

4. A vehicle security system according to claim 3 wherein said coded override means comprises means for accepting a multi-digit override code input as a series of control switch operations.

5. A vehicle security system according to claim 3 further comprising an indicator carried by said first housing; and wherein said security controller comprises acknowledgment means for operating said indicator to acknowledge input of an override code.

6. A vehicle security system according to claim 2 wherein said security controller is also switchable to a valet mode when in the disarmed mode responsive to said control switch; and wherein said security controller when in the valet mode is prevented from passively arming.

7. A vehicle security system according to claim 1 wherein said security controller is also switchable to a programming mode for permitting feature selection responsive to said control switch.

8. A vehicle security system according to claim 2 further comprising a flashing indicator carried by said first housing for indicating said security controller is in the armed mode.

9. A vehicle security system according to claim 1 wherein said first housing has a generally rectangular elongate shape.

10. A vehicle security system according to claim 1 wherein said control switch comprises a momentary contact switch.

11. A vehicle security system according to claim 1 further comprising a receiver positioned in said first housing and being connected to said antenna and said security controller.

12. A vehicle security system according to claim 1 further comprising a second housing; and wherein said security controller is positioned within said second housing.

13. A vehicle security system according to claim 12 further comprising an interconnecting cable extending between said first housing and said second housing.

14. A vehicle security system according to claim 13 further comprising first and second redundant connectors mounted in spaced relation on said first housing so that said interconnecting cable is connectable to one of said first and second redundant connectors to facilitate routing of said interconnecting cable.

15. A vehicle security system for a vehicle of a type comprising a front windshield area, said vehicle security system comprising:
at least one remote transmitter to be carried by a user;
a first housing for positioning adjacent the front windshield area of the vehicle;
a receiver carried by said first housing for receiving signals from said at least one remote transmitter;
a control switch carried by said first housing; and
a security controller positioned in spaced apart relation from said first housing and being operatively connected to said receiver to be responsive to signals from said at least one remote transmitter, said security controller also being responsive to said control switch.

16. A vehicle security system according to claim 15 wherein said security controller is switchable between armed and disarmed modes; wherein said security controller when in the armed mode is capable of generating an alarm signal responsive to a sensed vehicle condition; and wherein said security controller comprises passive arming means for passively arming by switching to the armed mode responsive to a sensed vehicle condition.

17. A vehicle security system according to claim 16 wherein said security controller comprises coded override means for switching to the disarmed mode from the armed mode responsive to operation of said control switch in a predetermined pattern based upon a user override code.

18. A vehicle security system according to claim 17 wherein said coded override means comprises means for accepting a multi-digit override code input as a series of control switch operations.

19. A vehicle security system according to claim 17 further comprising an indicator carried by said first housing; and wherein said security controller comprises acknowledgment means for operating said indicator to acknowledge input of an override code.

20. A vehicle security system according to claim 16 wherein said security controller is also switchable to a valet mode when in the disarmed mode responsive to said control switch; and wherein said security controller when in the valet mode is prevented from passively arming.

21. A vehicle security system according to claim 15 wherein said security controller is also switchable to a programming mode for permitting feature selection responsive to said control switch.

22. A vehicle security system according to claim 15 further comprising a second housing; and wherein said security controller is positioned within said second housing.

23. A vehicle security system according to claim 15 further comprising an interconnecting cable extending between said first housing and said second housing.

24. A vehicle security system according to claim 23 further comprising first and second redundant connectors mounted in spaced relation on said first housing so that said interconnecting cable is connectable to one of said first and second redundant connectors to facilitate routing of said interconnecting cable.

25. A vehicle security system for a vehicle of a type comprising a front windshield area, said vehicle security system comprising:
at least one remote transmitter to be carried by a user;
a first housing for positioning adjacent the front windshield area of the vehicle;
an antenna carried by said first housing for receiving signals from said at least one remote transmitter;
a control switch carried by said first housing; and
a security controller positioned in spaced apart relation from said first housing and being operatively connected to said antenna to be switchable between armed and disarmed modes responsive to signals from said at least one remote transmitter, said security controller also being responsive to said control switch, said security controller comprising coded override means for switching to the disarmed mode from the armed mode responsive to operation of said control switch in a predetermined pattern based upon a user override code.

26. A vehicle security system according to claim 25 wherein said coded override means comprises means for accepting a digital override code input as a series of control switch operations.

27. A vehicle security system according to claim 25 further comprising an indicator carried by said first housing; and wherein said security controller comprises acknowledgment means for operating said indicator to acknowledge input of an override code.

28. A vehicle security system according to claim 25 wherein said security controller is also switchable to a programming mode for permitting feature selection responsive to said control switch.

29. A vehicle security system according to claim 25 further comprising a receiver positioned in said first housing and being connected to said antenna and said security controller.

30. A vehicle security system according to claim 25 further comprising a second housing; and wherein said security controller is positioned within said second housing.

31. A vehicle security system according to claim 30 wherein said security controller is also switchable to a programming mode for permitting feature selection responsive to said control switch.

32. A vehicle security system according to claim 30 further comprising a receiver positioned in said first housing and being connected to said antenna and said security controller.

33. A vehicle security system according to claim 30 further comprising a second housing; and wherein said security controller is positioned within said second housing.

34. A vehicle security system for a vehicle of a type comprising a front windshield area, said vehicle security system comprising:
at least one remote transmitter to be carried by a user;
a first housing for positioning adjacent the front windshield area of the vehicle;
an antenna carried by said first housing for receiving signals from said at least one remote transmitter;
a valet switch carried by said first housing; and
a security controller positioned in spaced apart relation from said first housing and being operatively connected to said antenna to be switchable between armed and disarmed modes responsive to signals from said at least one remote transmitter, said security controller also comprising passive arming means for passively arming by switching to the armed mode responsive to a sensed vehicle condition, said security controller being also switchable to a valet mode when in the disarmed mode responsive to said valet switch, said security controller when in the valet mode being prevented from passively arming.

35. A method for operating a vehicle security system for a vehicle of a type comprising a front windshield area, the vehicle security system comprising at least one remote transmitter to be carried by a user, a first housing for positioning adjacent the front windshield area of the vehicle, at least one of an antenna and receiver carried by the first housing for receiving signals from the at least one remote transmitter, and a security controller positioned in spaced apart relation from the first housing and being responsive to signals from the at least one remote transmitter, the method further comprising the steps of:

providing a control switch carried by the first housing; and operating the security controller responsive to the control switch.

36. A method according to claim 35 wherein the security controller is switchable between armed and disarmed modes; wherein the security controller when in the armed mode is capable of generating an alarm signal responsive to a sensed vehicle condition; and wherein the security controller passively arms by switching to the armed mode responsive to a sensed vehicle condition; and wherein the step of operating the security controller responsive to the control switch comprises switching the security controller to the disarmed mode from the armed mode responsive to operation of the control switch in a predetermined pattern based upon a user override code.

37. A method according to claim 35 further comprising the step of operating an indicator to acknowledge input of a correct override code.

38. A method according to claim 35 wherein said security controller is also switchable to a valet mode when in the disarmed mode in which the security controller is prevented from passively arming; and wherein the step of operating the security controller responsive to the control switch comprises switching the security controller to the valet mode responsive to operation of the control switch.

39. A method according to claim 35 wherein said security controller is also switchable to a programming mode for permitting feature selection; and wherein the step of operating the security controller responsive to the control switch comprises switching the security system to the programming mode responsive to operation of the control switch.

* * * * *